United States Patent Office 2,742,364
Patented Apr. 17, 1956

2,742,364

NUT MEATS AND METHOD FOR PROCESSING THE SAME

Herbert Frank Neumann, South Orange, N. J., assignor to Colgate-Palmolive Company, Jersey City, N. J., a corporation of Delaware No Drawing. Application January 8, 1953,
Serial No. 330,359

9 Claims. (Cl. 99—127)

The present invention relates generally to nut meats and has particular reference to the processing of nut meats to enhance their keeping qualities and appearance, and to products resulting from such processing.

According to one known commercial procedure for preparing nuts, meats such as those of peanuts, Brazil, almond, cashew, pistachio, filbert, and pecan nuts are cooked in edible fats and/or oils at relatively high temperatures. If salted nuts are desired, common table salt (sodium chloride) is added to the meats after the cooking operation has been completed. After the salted nut meats have cooled they are fed to packaging machines and filled into suitable containers for commercial distribution.

Nut meats prepared by such a process have certain undesirable features which detract from their saleability. A particularly undesirable feature is that the meats are greasy to the touch. The cooking oils and fats transfer both to the hands of the consumer and to the walls of the containers in which the meats are packaged. A further undesirable feature is that a relatively large quantity of the salt comes loose from the meats and deposits on the consumer's hands as well as on the walls of the container resulting in a messy and unattractive appearance.

It now has been discovered that the undesirable features associated with nut meats prepared according to the process described hereinabove can be overcome or substantially eliminated by treating nut meats according to a new process.

Broadly, the process comprises applying a bonding agent comprising a molten, normally solid partial ester of an aliphatic polyhydric alcohol and a higher fatty acid to nut meats and then solidifying the bonding agent. If salted nut meats are desired, salt may be added to the meats before the bonding agent is solidified.

The process of this invention provides a method for producing nut meats which are dry to the touch and which have a glossy appearance, both of which features make the meats attractive to the consumer. The ester bonding agent forms a thin solid film or covering on the exterior surfaces of the nut meats which aids in preserving the freshness of the meats without altering either their natural flavor or color. The ester bonding agent itself does not deteriorate on standing and the nut meats and cooking oils and fats associated therewith are less liable to spoil or become rancid by reason of the fact that the covering film of the bonding agent minimizes contact of the meats and the oils and fats with air. The process also provides a method for preparing evenly salted nut meats to which the salt adheres much better than to nut meats processed by certain prior art procedures.

According to the process of this invention the nut meats first are cooked in an edible fat and/or oil. The cooking operation may be carried out advantageously by placing the nut meats in a wire basket and then submerging the same in a bath of a suitable vegetable cooking oil or fat at a temperature of about 250° F. to about 350° F. The nut meats are left in the oil until they acquire a light, golden brown color which usually requires about 15 to 30 minutes. Upon completion of the cooking operation the basket is removed from the oil and the nut meats are drained in any convenient manner, e. g., as by pouring the same onto a mesh screen. The edible partial ester bonding agent then is applied to the exterior surface of the nut meats.

The particular edible partial esters suitable for use as bonding agents in accordance with the present invention include those esters which are molten at temperatures above the temperatures to which the meats are exposed during storage and transit and which are solids at such temperatures. Such partial ester compounds may be prepared by reacting a higher fatty acid with a suitable aliphatic polyhydric alcohol. The higher fatty acids which may be employed include those which contain about 12 to about 24 carbon atoms per molecule, those fatty acids having about 12 to about 18 carbon atoms per molecule being particularly suitable. If desired, partially hydrogenated edible tallow, coconut oil, corn oil and the like, instead of the above described fatty acids per se, may be reacted with suitable aliphatic polyhydric alcohols to form the ester compounds.

Aliphatic polyhydric alcohols which may be employed in preparing the said partial ester compounds include glycerin, propylene glycol, and erythritol. More particularly, representative examples of suitable partial ester compounds include glyceryl monolaurate, glyceryl monopalmitate, propylene glycol monopalmitate, propylene glycol monostearate and the like, glyceryl monostearate being particularly suitable.

The bonding agent may consist of one or more of the edible partial ester compounds described. When glyceryl monostearate is selected for use as the bonding agent it may be applied conveniently by adding a quantity of the same in solid form, preferably as a powder, to the hot nut meats while they are being agitated. The hot meats will melt the ester and the resultant molten ester material will distribute evenly over the entire exterior surfaces of the meats. If salted meats are desired, salt is added to the molten ester-coated meats while the same are being agitated so that the salt also will distribute uniformly upon the surfaces of the nut meats. Upon cooling, the molten ester bonding agent solidifies thereby securely bonding the salt to the nut meats.

If desired, instead of adding the edible partial ester bonding agent to the hot nut meats in solid form, the ester material may be melted and then poured or sprayed in molten form onto the nut meats either immediately after the cooking operation and while the drained meats are still hot or after the meats have cooled to any desired temperature. To this end the nut meats may be placed in a coating apparatus which can be in the form of a revolving drum. The molten ester material then either is poured or sprayed onto the nut meats while the same are being agitated in the revolving drum. Instead of a drum, revolving pans provided with means for agitating the nut meats may be employed.

If salted nut meats are desired, salt may be sprinkled over the meats after the same have been coated with a film of the molten ester material. The heated meats then are cooled to a temperature below the melting point of the ester material to solidify the latter.

The treated nut meats may be cooled in any desired manner, one convenient method being to bring the meats into intimate contact with a draft of cooling air while they are being agitated whereupon the molten ester will solidify and securely bond the salt to the nut meats.

Preferably, the partial ester bonding agents are applied in an amount within the range of about 0.2 to about 1.0 per cent by weight of that of the nut meats being processed. Amounts within this range are sufficient to impart a thin solid film coating about the exterior surfaces of the meats which is capable of sealing in the cooking oils and bonding the salt securely to the meats.

The product resulting from the process of this invention comprises nut meats having a solid thin covering of an edible partial ester bonding agent. The film renders the meats non-oily and dry to the touch. The film also serves as a bonding agent between salt and the meats thus providing a product which does not shed salt readily. As a result the nut meats are easier to handle and present a neater appearance when packaged, for example, in transparent packages than do nut meats processed according to the prior art.

While there has been disclosed and described what at present is considered to be the preferred embodiment of the present invention, it will be understood, of course, that many modifications, changes, substitutions, etc., may be made therein without departing from the true scope of the invention as defined in the appended claims.

Having thus described the invention, what is claimed is:

1. A process which comprises applying a molten, normally solid bonding agent comprising at least one edible partial ester of an aliphatic polyhydric alcohol and a higher fatty acid to the surface of nut meats, and thereafter solidifying said bonding agent.

2. A process which comprises applying salt and a molten, normally solid bonding agent comprising at least one edible partial ester of an aliphatic polyhydric alcohol and a higher fatty acid about the exterior surfaces of nut meats, and thereafter solidifying said bonding agent whereby said salt is bonded to the nut meats.

3. A process which comprises melting at least one edible partial ester of an aliphatic polyhydric alcohol and a higher fatty acid, coating the exterior surfaces of nut meats with said molten ester, applying salt to the nut meats while the ester is still molten, and cooling the nut meats to solidify said ester and bond said salt to the nut meats.

4. A process as set forth in claim 3 in which said edible partial ester is glyceryl monostearate.

5. Nut meats having an exterior coating of an edible bonding agent, said bonding agent comprising at least one partial ester of an aliphatic polyhydric alcohol and a higher fatty acid.

6. Nut meats having an exterior coating of an edible bonding agent and salt adhering to said bonding agent, said bonding agent comprising at least one partial ester of an aliphatic polyhydric alcohol and a higher fatty acid.

7. Nut meats as set forth in claim 6 in which said bonding agent comprises glyceryl monostearate.

8. A process which comprises melting glyceryl monostearate, coating the exterior surfaces of cooked or roasted nut meats with an amount of said glyceryl monostearate within the range of about 0.2–1.0 per cent of the weight of the nut meats, applying salt to the coated nut meats while the glyceryl monostearate is still molten and cooling the nut meats to solidify the glyceryl monostearate and bond the salt to the nut meats.

9. Cooked or roasted nut meats having an exterior coating of glyceryl monostearate and salt adhering to the glyceryl monostearate, the said glyceryl monostearate coating being about 0.2–1.0 per cent by weight of the nut meats.

References Cited in the file of this patent

UNITED STATES PATENTS

| | | |
|---|---|---|
| 2,026,813 | Bizzell | Jan. 7, 1936 |
| 2,582,188 | Zaloom | Jan. 8, 1952 |

OTHER REFERENCES

"The Condensed Chemical Dictionary," by Gregory, Reinhold Publishing Corporation, 330 West Forty-Second Street, New York, 1942, Third Edition, pages 328 and 530.

"Industrial Oil and Fat Products" by Alton E. Bailey, Interscience Publishers, Inc., New York, New York, 1945, pages 4 and 5.